June 5, 1934. W. SCHEPPMANN 1,961,598

WIRELESS DIRECTION FINDER

Filed July 17, 1929  2 Sheets-Sheet 1

Inventor:
Wilhelm Scheppmann
by Paul D. ...
Attorney

June 5, 1934.   W. SCHEPPMANN   1,961,598
WIRELESS DIRECTION FINDER
Filed July 17, 1929   2 Sheets-Sheet 2

Inventor:
Wilhelm Scheppmann
by
Attorney

Patented June 5, 1934

1,961,598

UNITED STATES PATENT OFFICE 1,961,598

WIRELESS DIRECTION-FINDER

Wilhelm Scheppmann, Berlin-Tempelhof, Germany, assignor to C. Lorenz Aktiengesellschaft, Berlin-Tempelhof, Germany Application July 17, 1929, Serial No. 378,866
In Germany July 19, 1928

11 Claims. (Cl. 250—11)

The methods of direction finding which have hitherto become well-known are attended with the disadvantage that their principle of operation is to determine the absolute minimum of receiving energy in a directional antenna system preferably a frame antenna. As is well known, it is extremely difficult to determine an exact minimum with such arrangements, since an audible reception even with only a few degrees of angular deviation from the actual objective line cannot be obtained in most cases, because the directional characteristic of a frame antenna consists of two circles the centres of which lie on a straight line at right angles to the objective line; and signals can be heard in the receiving devices, only if the line of direction from which the signals arrive cuts the two circles. A further disadvantage of this method resides in the fact that an indication of the direction with a direct reading instrument cannot be obtained at all. The demand for better methods of direction finding is exceedingly great, since the extremely rapid development of aerial traffic requires the completion of an extensive system with beacon transmitters.

These disadvantages are avoided by apparatus according to this invention, wherein two directional antennæ are continuously coupled with a non-directional antenna and the total effect of the energy received by each of the directional antennæ in combination with that received by the non-directional antenna acts on an indicating instrument. The apparatus according to this invention has the advantage that all the antennæ are and remain stationary, and the indication of the direction is made possible by direct reading in a measuring instrument, as well as by audible reception by means of a telephone. Moreover, it has the advantage that it still works satisfactorily even in the case of any weakening of the received energy due to atmospheric influence.

Figure 1:
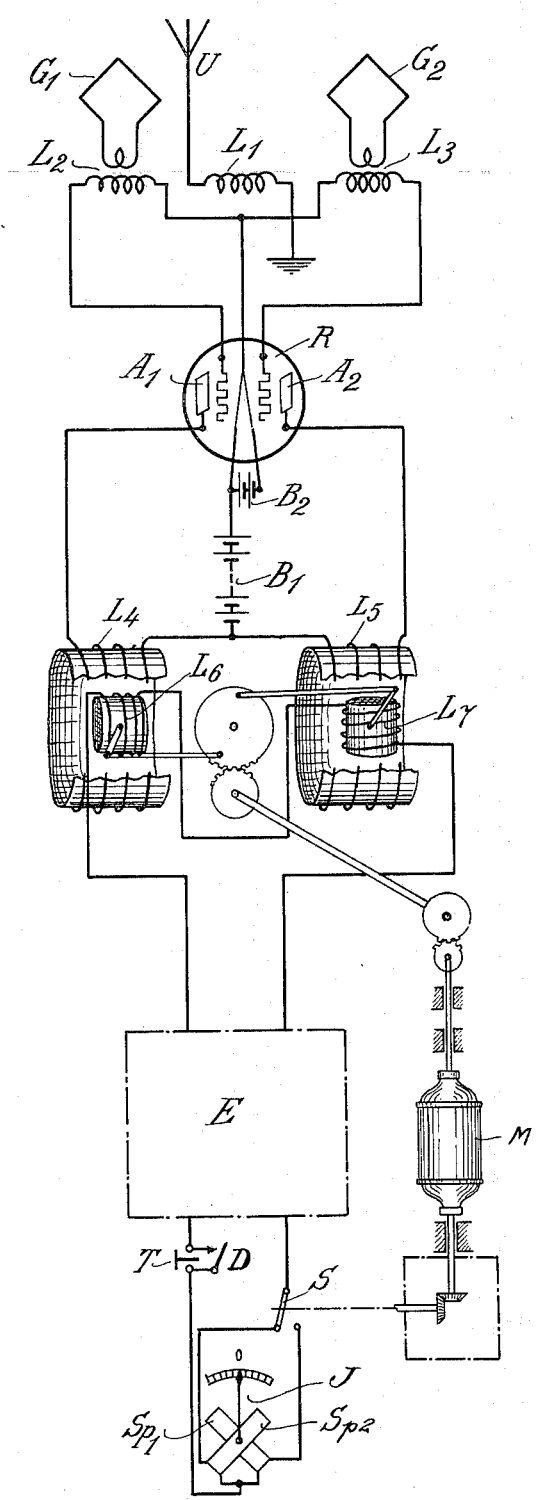
Figure 3:
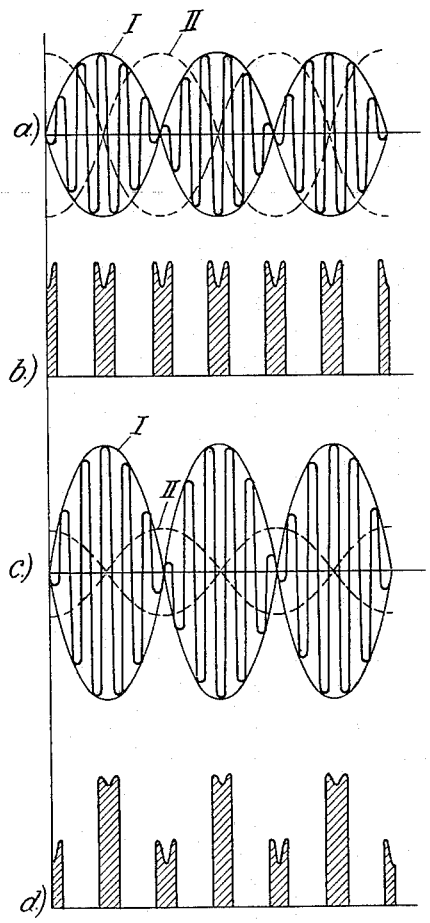
Figure 2:
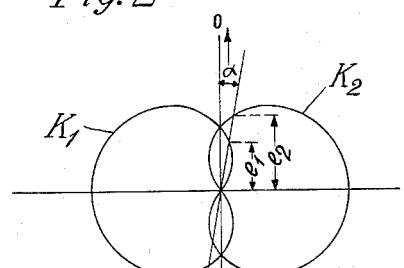
Figure 4:
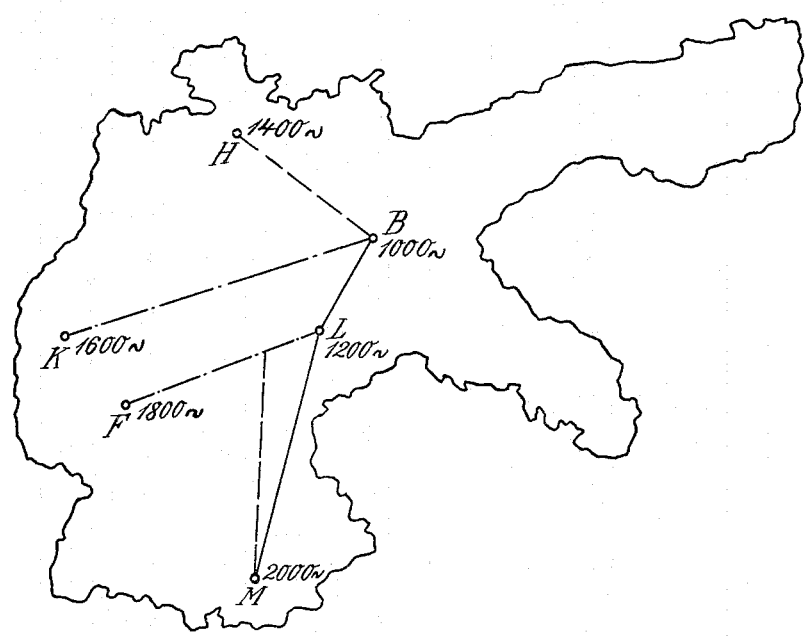

Figure 1 presents a diagrammatic illustration of an arrangement according to this invention; Figure 2 shows the directional characteristic of two-frame or loop antennæ combined with an open or non-direction antenna; Figure 3 shows the nature of the currents which affect an indicator; Figure 4 is a geographical chart showing the position of several transmitters for the guidance of aeroplanes in flight.

Figure 5:
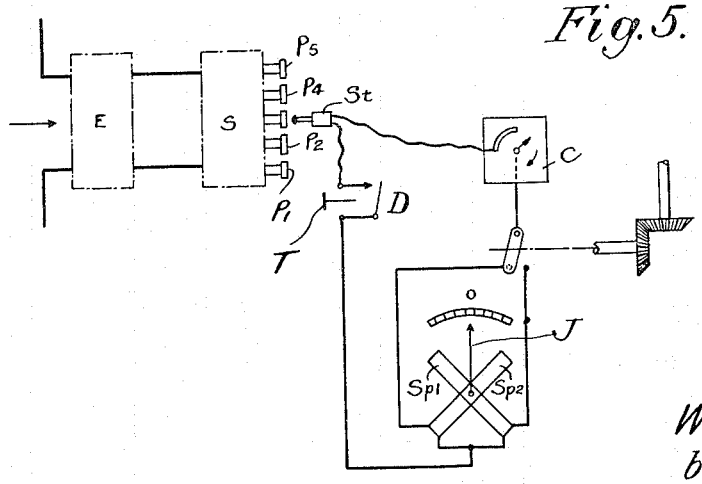

Fig. 5 shows the means for associating a direction finding apparatus with any one of a number of radio beacons each transmitting a common carrier frequency modulated by a characteristic modulating frequency.

Two frame antennæ $G_1$ and $G_2$, which lie in the same plane and 180° apart, are coupled with the non-directional antennæ U, through the induction coil $L_1$ in opposite senses, by means of the two coils $L_2$ and $L_3$. The inductances $L_2$, $L_3$ are each connected to a vacuum tube which, in the illustrated example, comprises two grids, two anodes and a filament arranged in a common glass vessel R. One of the grids is connected to the secondary of the coil $L_2$ and the other to the secondary of the coil $L_3$. The antenna U is connected through coil $L_1$ directly to ground. The anodes $A_1$ and $A_2$ are connected with primary coils $L_4$ and $L_5$ respectively, whilst the anode battery $B_1$ is used in common for both anodes. The battery $B_2$ serves for heating the glow cathode and is connected with the grid circuit in well-known manner.

With the inductances $L_4$ and $L_5$ there can be variably coupled two secondary coils $L_6$, $L_7$ mounted to be rotatable and displaced relative to one another. These two coils connected in series form the input circuit of an ordinary rectifying receiver E, diagrammatically illustrated in the drawings, to the output terminal of which the listening telephone T is connected. A three pole pivot of the switch S is connected with the receiver, whilst the two other contacts lead to the outer ends of the two coils $SP_1$ and $SP_2$ of an instrument J. The planes of this coil are at right angles to each other and each has a terminal thereof connected to one of the fixed points of the switch S. The junction of the coils can be connected with the receiving telephone. The zero position of the pointer of the instrument J is at the middle of the scale, as illustrated, and the marking on the scale is preferably from the middle outwards. Both the inductances $L_6$, $L_7$, and the switch S are actuated by a common small motor M.

The manner of working of the whole apparatus is apparent from Figs. 2 and 3. The directional characteristic of a frame antenna which is combined with a non-directional antenna is represented as a cardioid, as is well-known. In the arrangement according to the invention, two frame antennæ with one non-directional antenna are used, so that a directional characteristic as illustrated in Fig. 2 is obtained. O indicates the direction in which the transmitter is located whilst the two cardioids $K_1$ and $K_2$ represent the energies received on the combined loop antennæ and the open antennæ. The cardioid $K_1$, which results from the combination of the frame antenna $G_1$ and the non-directional antenna U, is, in fact, turned by 180° with respect to the cardioid resulting from the combination of the frame antenna $G_2$ and the non-directional antenna U, since, as stated above, the direction of the winding of one frame antenna is opposite to that of the other. If the aeroplane is in the direction O towards the transmitter, then the energies received by the two antennæ combinations, that is, $G_1$ and U and $G_2$ and U combinations, as shown by $K_1$ and $K_2$, are exactly equal. Since the coils $Sp_1$ and $Sp_2$ of the revolving coil instrument J, Fig. 1, are connected in opposition to each other, the effects of these energies of equal strength are neutralized in the indicator so that the pointer of the indicator stops at the center of the associated scale and in such a way indicates that the airplane is heading exactly toward the proper transmitting station.

If the aeroplane deviates by the angle α from its course, then the energy received as shown by $K_1$ becomes smaller and that received as shown by $K_2$ becomes larger. In this case, as shown in Fig. 2, $e_1$ is the energy absorbed by the antennæ combination $K_1$ including $G_1$ and U, and $e_2$ is the energy absorbed by the antennæ combination $K_2$ including $G_2$ and U. Thus, the indicator of the instrument J is acted upon and moved toward one side by a force corresponding to the amount $e_1$ and to the other side by a force corresponding to the amount $e_2$. The indicator pointer, consequently, assumes a position corresponding to the difference $e_2 - e_1$, thus indicating the deviation from the goal of the flight. That is to say, the coils $Sp_1$ and $Sp_2$ affect the pointer of the instrument indicator J oppositely; and so long as the current in the two coils is equal a zero reading results but when the current in one coil exceeds that in the other an indication is obtained.

In the operation of the described arrangement, the individual antenna combinations are caused to act on the indicating instrument, periodically after one another, by the small motor M. In the position of the inductance $L_6$ shown in Fig. 1, this inductance is fully coupled with $L_4$, whilst $L_5$ and $L_7$ are not coupled at the moment in question, so that no energy flows from the right hand side of the circuit to the indicating instrument. The energy supplied to the receiving apparatus has the forms illustrated in Fig. 3, in which a) and b) represent the oscillations received when they come from the direction O, as when an airship is flying towards O; and c) and d) represent the oscillations received when the plane is in a course deviating from the transmitter. By turning the coil $L_6$ into the position of greatest possible coupling, the energy supplied to the receiver E increases slowly according to curve 1 Fig. 3a, and slowly decreases again as the coupling diminishes. When this energy has reached the maximum amount and the curve I has accordingly reached its maximum, the energy conducted over the coils $L_7$ from the antenna U and $G_2$ to the receiver E and represented by the dotted curve II increases and correspondingly again decreases. Since the increasing and decreasing of the energy is unpleasantly manifested in the listening device as howls, the switch S constructed preferably as a commutator, is inserted into the output circuit. The switch is thrown synchronously with the coils in the input circuit and its periods of closure are so determined that equal amounts of energy are passed through the indicating instrument in opposite directions in a manner illustrated in Fig. 3b. If, on the contrary, the flight of an aeroplane or airship bearing the invention deviates from the objective or true direction, then the quantities of energy received by the antennæ combinations are no longer equal but have somewhat the appearance according to Figs. 3, c—d. The pointer of the rotating coil instrument thus does not remain stationary in the zero position. A particular advantage is that it is always the difference of the quantities of energy received by the two antenna combinations which act on the indicating instrument. Only by this means can incorrect direction determinations, which might occur due to atmospheric weakening of the received energy, be avoided.

The telephone T, under normal operating conditions, is not included in the output circuit of the receiver E but the pilot will usually steer according to the indicating instrument. Should he, however, have any doubt about the correctness of the indications, then he puts into circuit his head-phones, say, with a push-button and thus controls the indications of the instrument.

The apparatus described as above is suitable for an organization in which all the beacon transmitters work on the same wave and the radiated frequency of each beason transmitter is modulated with a different frequency. Hitherto, a demand for such an extensive direction determining apparatus has not existed since it was not possible to provide direction determining devices which allow direct reading of the direction from a measuring instrument. With the device of the present invention, however, an extensive system of beacon stations is made feasible, since each aeroplane can be equipped correspondingly and the pilot need no longer be expected to steer with the headphones according to minimum reception from a transmitter. Even if the pilot could have done away with the disadvantage of audible reception, a multiple arrangement of beacon stations would have been impossible, since the waveband available in flying is limited in the same way as in other fields. For direction finders only one special wave will now be needed, or only a few waves at the most. Therefore, according to the further invention all the beacon stations work on the same wave length. The working on one wave is all the more desirable because of the requirement that beacon transmitters, if they are to be of value, must be in operation uninterrupted day and night since aeroplanes are in service through the entire twenty-four hours. The wave chosen is thus excluded even for a temporary use for any other purpose. In order that the aeroplane, however, can steer to the desired objective, according to the invention, the high-frequency wave radiated by a beacon transmitter is modulated with a different frequency and, for the purpose of ascertaining the desired transmitter, corresponding filter circuits are inserted in the direction determining receiver.

Referring now to Fig. 5, the receiver E has associated therewith a case S in which are included a number of filter circuits which terminate in the plug sockets $p_1$, $p_2$, $p_3$, etc. Arranged to be connected with any one of these plug sockets by means of the plug $St$ is a cord circuit in which is connected the indicating instrument J. In the cord circuit is a clock C, which may be of any type suitable for the purpose which is adapted to connect the plug $St$ to the fixed terminal of the three-point switch S for a predetermined period, and then to disconnect the plug from this switch terminal for another predetermined period. The opposite ends of the two terminals $Sp_1$ and $Sp_2$ are adapted to be alternately connected to the fixed terminal of the three-point switch S through the gearing which is controlled by motor M shown in Fig. 2.

The utility of the invention will become clear with a practical example which is shown diagrammatically in Fig. 4, for Germany. The transmitters Berlin B, Hamburg H, Cologne K, Frankfort F, Munich M and Leipzic-Halle L, all work, for instance, on the 900 meter wave according to any of the usual methods. Moreover, the 900 meter wave is modulated with a station sound, Berlin say with 1000, Leipzic with 1200 etc., as indicated in the figure. In order that the direction finding apparatus may be adjusted to any desired wavelength the pilot need do nothing more than insert the plug St in one or other of the filter plug sockets $p_1$, $p_2$, etc., corresponding to the desired course. For instance, if he is on a flight from Berlin to Munich via Leipzic, then in Berlin he inserts the plug St in the plug socket $p_2$ associated with the 1200 frequency filter and flies to Leipzic. After he has reached Leipzic, he must follow the course to Munich, and for this purpose connects the plug St in the plug socket $p_6$ associated with the 2000 frequency filter and locates the direction of Munich. By use of this filter, all the other beacon transmitters for his receiving instrument are cut out, although they work on the same wave-length.

For instance, if there is reported from the flight controlling station a storm on the direct course from Leipzic-Munich, and if the aeroplane is to deviate from the same towards the west, then the pilot flies first of all in the Frankfort direction by inserting the plug St in the plug socket $p_5$ associated with the 1800 frequency and not until he is over Thuringia does he turn into the Munich course, which is shown in the drawings by dashes, by associating the coils $Sp_1$, $Sp_2$ with the 2000 frequency filter through the plug socket $p_6$ in the manner previously mentioned. As the land is covered with a large number of beacon transmitters, then, analogously to the example just given, almost any indirect course can be correspondingly taken.

Further, according to the invention the transmitting stations do not work during the whole time with the same energy, but periodically with decreased energy in order to facilitate perfect location of the direction of the transmitter in its close neighbourhood. For this purpose, each transmitter operates, for instance, for 45 seconds with an energy of 300 watts and in the next 15 seconds only with an energy of 10 watts. During the 45 seconds, the aeroplane determines the direction if it is at a great distance from the transmitter. The nearer it comes to the transmitter, however, the more inaccurate becomes the indication of the instrument, since on the one hand the directional effect of the frame antenna becomes smaller, and on the other hand the high-frequency energy radiated by the transmitter acts directly on the tuning circuits of the receiver. This is remedied by the energy of the transmitter being decreased, and within this period the direction determination is accomplished. For instance the pilot switches on the receiving arrangement merely during this period, or still better a clock C is arranged in circuit with the plug St, as shown in Fig. 5, which every minute automatically switches on the receiving apparatus for 15 seconds when the airplane is near the beacon transmitter or for 45 seconds when the airplane is at a greater distance from the transmitter.

Instead of the above-mentioned modulation of the radiated transmitter oscillation with a sound frequency, of course, also other combinations can be emitted, by means of which corresponding receiving members are excited.

Claims:

1. The combination of a non-directional antenna with a pair of directional antennæ, means for amplifying the oscillations due to the non-directional antenna and one of the directional antennæ, and oscillations due to the non-directional antenna and the other directional antenna, a receiver, a pair of variable coupling coils between the receiver and amplifying means to impress the effect of the one set of said oscillations upon the receiver, a pair of variable coils between the amplifier and receiver to impress the effect of the other set of oscillations on the receiver, means for continuously varying the coupling of each pair of said coils so that the coupling of one pair is at a maximum while the coupling of the other pair is at a minimum, the effects of the two sets of oscillations being thereby impressed on the receiver in alternation, an indicating instrument having a pair of coils with a common terminal united to the receiver, a switch for uniting the other terminal of each pair of coils in alternation to said receiver, and means for connecting the switch to be operated in unison with said coupling coils to cause the instrument to indicate the direction of transmission.

2. Direction finding apparatus comprising directional means for simultaneously receiving oscillations from a plurality of radio beacons each transmitting a common carrier frequency modulated by a characteristic modulation frequency, a plurality of electrical systems each having a non-uniform directional characteristic comprised in said means, a detecting circuit, means for alternately impressing on said detecting circuit oscillations proportional to those received by one of said electrical systems and those received by another of the electrical systems, a plurality of filters each adapted to pass that portion of the detected energy corresponding to the modulation frequency characteristic of a particular beacon, an indicating instrument, switching means for associating said instrument with a selected beacon by connecting the instrument in the output circuit of the proper filter, and means in said indicating instrument operable by the energy in said output circuit for indicating the azimuthal direction of the selected beacon.

3. Direction finding apparatus comprising a non-directional and two directional antennæ for simultaneously receiving oscillations from a plurality of radio beacons each transmitting a common carrier frequency modulated by a characteristic modulation frequency, a detecting circuit, means for alternately impressing on said detecting circuit oscillations proportional to those received by one directional and said non-directional antennæ and those received by the other directional and said non-directional antennæ, a plurality of filters each designed to pass that portion of the detected energy corresponding to the modulation frequency characteristic of a particular beacon, an indicating instrument, switching means for connecting said instrument with the output circuit of any filter, and means in the indicator operable by the energy in said output circuit for indicating the azimuthal direction of the beacon selected through the connected filter.

4. Direction finding apparatus comprising a non-directional and two directional antennæ for simultaneously receiving oscillations from a plurality of radio beacons each transmitting a common carrier frequency modulated by a characteristic modulation frequency, a detecting circuit, means for alternately impressing on said detecting circuit oscillations proportional to those received by one directional and said non-directional antennæ and oscillations proportional to those received by the other directional antennæ and said non-directional antennæ, a plurality of filters each adapted to pass that portion of the detected energy corresponding to the modulation frequency characteristic of a particular beacon, an indicating instrument, switching means for associating said instrument with a selected beacon by connecting the instrument in the output circuit of the proper filter, means, operable in synchronism with the alternate impression of the above-mentioned oscillations on said detecting circuit, for reversing the direction in which the output energy of the selected filter passes through said instrument, and means in said instrument controlled by said energy reversals for indicating the azimuthal direction of the selected radio beacon.

5. Directional finding apparatus comprising a non-directional and two directional antennæ for simultaneously receiving oscillations from a plurality of radio beacons each transmitting a common carrier frequency modulated by a characteristic modulation frequency, a detecting circuit, means for alternately impressing on said detecting circuit oscillations proportional to those received by one directional and said non-directional antennæ and oscillations proportional to those received by the other directional antennæ and said non-directional antennæ, a plurality of filters each adapted to pass that portion of the detected energy corresponding to the modulation frequency characteristic of a particular beacon, an indicating instrument, switching means for associating said instrument with a selected beacon by connecting the instrument in the output circuit of the proper filter, means for reversing the direction in which the energy of the selected filter is passed through said instrument whenever the oscillations impressed upon said detecting circuit change from those received by one directional and said non-directional antennæ to those received by the other directional and said non-directional antennæ, and means in said instrument controlled by said energy reversals for indicating the azimuthal direction of the selected radio beacon.

6. Direction finding apparatus comprising a non-directional and two directional antennæ for simultaneously receiving oscillations from a plurality of radio beacons each transmitting a common carrier frequency modulated by a characteristic modulation frequency, a detecting circuit, means for alternately impressing on said detecting circuit oscillations proportional to those received by one directional and said non-directional antennæ and oscillations proportional to those received by the other directional antennæ and said non-directional antennæ, a plurality of filters each adapted to pass that portion of the detected energy corresponding to the modulation frequency characteristic of a particular beacon, a rotating coil indicating instrument, having two windings in series, connectable in the output circuit of any filter, means for reversing the direction in which the output energy of the selected filter is passed through said series windings whenever the oscillations impressed upon said detecting circuit change from those received by one directional and said non-directional antennæ to those received by the other directional and said non-directional antennæ, said series windings being operated by said energy reversals to cause an indication of the azimuthal direction of the selected radio beacon.

7. Direction finding apparatus comprising a non-directional and two directional antennæ for simultaneously receiving oscillations from a plurality of radio beacons each transmitting a common carrier frequency modulated by a characteristic modulation frequency, a high frequency amplifier for simultaneously amplifying the oscillations received by one directional and said non-directional antennæ and those received by the other directional antennæ and said non-directional antennæ, a detecting circuit, variable inductive couplings between said amplifier and said detecting circuit, a plurality of filters each adapted to pass that portion of the detected energy corresponding to the modulation frequency characteristic of a particular beacon, an indicating instrument connectable in the output circuit of any filter, switching means for reversing the direction in which the energy in the output circuit of the selected filter passes through said instrument, and a continuously operable motor for varying said couplings in alternation and operating said switching means in such a manner that the output energy of the selected filter passes in one direction through said instrument when oscillations from one directional and said non-directional antennæ are impressed upon said detecting circuit and passes in the opposite direction therethrough when oscillations from the other directional and said non-directional antennæ are impressed thereon.

8. Direction finding apparatus comprising means for simultaneously receiving oscillations from a plurality of radio beacons each transmitting a common carrier frequency modulated by a characteristic modulation frequency, means for amplifying the received oscillations and other means for detecting the amplified oscillations, a plurality of filters each adapted to pass that portion of the detecting energy corresponding to the modulation frequency characteristic of a particular beacon, an indicating instrument, switching means for associating said instrument with a selected beacon by connecting the instrument in the output circuit of the proper filter, and clock controlled means for alternately opening and closing the connection between the selected filter and said instrument for predetermined intervals of time.

9. Direction finding apparatus comprising means for simultaneously receiving oscillations from a plurality of radio beacons each transmitting a common carrier frequency modulated by a characteristic modulation frequency, means for amplifying the received oscillations and other means for detecting the amplified oscillations, a plurality of filters each adapted to pass that portion of the detecting energy corresponding to the modulation frequency characteristic of a particular beacon and each having an output circuit terminating in a switchboard, an indicating instrument, a cord circuit for connecting said instrument through said switchboard to the output circuit of any filter, and clock controlled means in said cord circuit for alternately opening and closing the connection between said instrument for predetermined intervals of time.

10. In a direction finder, means for obtaining a more critical indication of the direction of an oscillation emitter comprising, in combination, a non-directional antenna, two frame antennæ positioned in the same plane and inductively coupled in opposite senses to said non-directional antenna, an indicating instrument, and means for alternately passing energy, proportional to the energy received from said emitter by one frame antenna and said non-directional antenna, in one direction through said instrument and energy, proportional to the energy received from said emitter by the other frame antenna and said non-directional antenna, in the opposite direction through said instrument, and means in said instrument controlled by said energy reversals for indicating the direction of said emitter.

11. In a direction finder, means for obtaining a more critical indication of the direction of an oscillation emitter comprising, in combination, a non-directional antenna, two frame antennæ positioned 180° apart, an indicating instrument, and means for alternating passing energy, proportional to the energy received from said emitter by one frame antenna and said non-directional antenna, in one direction through said instrument and energy, proportional to the energy received from said emitter by the other frame antenna and said non-directional antenna, in the opposite direction through said instrument.

WILHELM SCHEPPMANN.